United States Patent [19]

Ford

[11] Patent Number: 4,623,774

[45] Date of Patent: Nov. 18, 1986

[54] METHOD AND APPARATUS FOR THE WELDING OF A BALL AND ROD ASSEMBLY

[75] Inventor: Ronald N. Ford, Lockport, Ill.

[73] Assignee: Sciaky Bros., Inc., Chicago, Ill.

[21] Appl. No.: 682,251

[22] Filed: Dec. 17, 1984

[51] Int. Cl.[4] ............................................. B23K 11/32
[52] U.S. Cl. .................................. 219/78.13; 219/79; 219/117.1; 219/156
[58] Field of Search ................... 219/78.01, 78.13, 79, 219/117.1, 149, 150 R, 152, 156

[56] References Cited

U.S. PATENT DOCUMENTS

| | | | |
|---|---|---|---|
| 2,957,070 | 10/1960 | Schächter et al. | 219/79 |
| 4,086,464 | 4/1978 | Day et al. | 219/156 |
| 4,317,267 | 3/1982 | Usui | 219/78.13 X |
| 4,385,222 | 5/1983 | Hinden | 219/118 X |

FOREIGN PATENT DOCUMENTS 2506867 9/1976 Fed. Rep. of Germany ...... 219/156

*Primary Examiner*—E. A. Goldberg
*Assistant Examiner*—C. M. Sigda
*Attorney, Agent, or Firm*—Julius L. Solomon

[57] ABSTRACT

An automatic welding and annealing machine and specifically a machine for producing unique piston connecting rod assemblies utilized in compressors used in automotive air conditioning systems. The parts produced by this machine are comprised of a rod approximately one-quarter of one inch in diameter and one and three-quarters inch long to which steel balls of approximately one-half inch diameter are welded at each end. These parts are to be used as connecting rods for variable displacement piston pumps. The machine incorporates feeding mechanisms for feeding the separate parts to the welding station and then to the annealing station and also includes a laser inspection apparatus for checking the dimensions of the rods and of the welded and annealed parts, to see that they are within set tolerances. Measuring devices are also provided for monitoring and controlling the electric currents and forces used during welding and annealing of the parts.

6 Claims, 5 Drawing Figures

METHOD AND APPARATUS FOR THE WELDING OF A BALL AND ROD ASSEMBLY

This invention relates to an automatic welding and annealing machine and specifically to a machine for producing unique piston connecting rod assemblies utilized in compressors used in automotive air conditioning systems. The parts produced by this machine are comprised of a rod appproximately one-quarter of one inch in diameter and one and three-quarters inch long to which steel balls, approximately one-half inch in diameter, are welded at each end. These parts are to be used as connecting rods for variable displacement piston pumps. The machine incorporates feeding mechanisms for feeding the separate parts to the welding station and also includes means for checking the dimensions of the several parts to see that they are within set tolerances.

The rods are fed automatically upon demand from a hopper into a vibratory bowl feeder. When activated, the feeder causes the rods to free fall down a ramp to a laser inspection apparatus which checks the rods for length and rejects them automatically if they are 0.001 inch too long or 0.001 inch too short. Rods that pass inspection continue to slide down the ramp to a shuttle magazine which shuttles them one at a time upon demand into the clamps situated between the two electrodes of a welding machine. A magnetic proximity sensor on the shuttle magazine keeps the magazine full by switching on the rod feeder when the magazine level falls below a preset point. When signaled, a ball hopper loads balls into a vibratory-type ball feeder. The ball feeder runs continuously and fills two tubes which stage the balls at ball escapements; the balls are fed upon demand by the escapements and are then allowed to fall on top of the welder electrodes during the period when the parts which have previously been loaded are being welded. When the electrodes return and release the parts which have been welded, the balls fall from the tops of the electrodes into pockets and are caught by nylon pins and held in position. The weld clamps open and the welded part is rolled out of the clamp by the raising of an exit conveyor. A shuttle then pushes another rod into the welder clamps and simultaneously signals the welder clamps to close upon the shuttle's return stroke. The welder electrodes, each carrying a ball, advance after the clamps are fully closed and both balls are then welded simultaneously to the ends of the rod with a concentricity to the rod within ±0.002". The welder will cycle automatically as described above until the exit conveyor becomes full. This exit conveyor also acts as a cooling conveyor for the parts which have been heated by the welding process prior to the parts reaching the annealing station. Once the conveyor becomes full, a proximity sensor signals the annealer station to join into the machine sequence. An escapement releases parts one at a time into the annealer clamps, which close upon a signal after which the annealer electrodes engage the part, anneal and size the part to length within ±0.001" and concentric to the rod within ±0.003". The annealer exit conveyor lifts and removes the finished part after the clamps holding the part open. This sequence of operation continues indefinitely as long as parts are supplied to the machine. Prior to the development of the automatic machine described herewith, the ball and piston rods were manufactured either from cylindrical metal rods which were machined to the proper shape, and polished and hardened at all wear surfaces, or the rods were forged to the approximate shape desired and then machined, polished and hardened. The old process for manufacturing these piston rods was costly in time/and labor, required several steps in the manufacturing process and required moving the parts in a proper sequence to several work stations at which separate operations were performed.

The present invention has as an object the automatic production of piston rods of the type herein described.

Another object is to weld metal balls to both ends of a steel rod simultaneously.

A further object is to provide a means for automatically feeding the several parts comprising a piston rod to the welding apparatus which is to weld the balls to the rod.

Another object is to automatically eject any parts which are out of tolerance as they are being fed to the machine.

Another object is to provide means for positioning the balls and rods with repect to one another prior to performing the welding operation.

Another object is to provide means for annealing those portions of the piston rod assembly which have been heated during the welding operation.

Another object is to provide means for removing heat from the parts prior to annealing the piston rod assemblies.

Another object of the invention is to provide means for sizing the rod and ball assembly during the annealing operation.

Another object is to provide means for an orderly and jam-proof progression of the parts through the machine, both prior to and after the welding and annealing operations.

The invention may be better understood by referring to the drawings, in which

Figures 1, 4, 5:
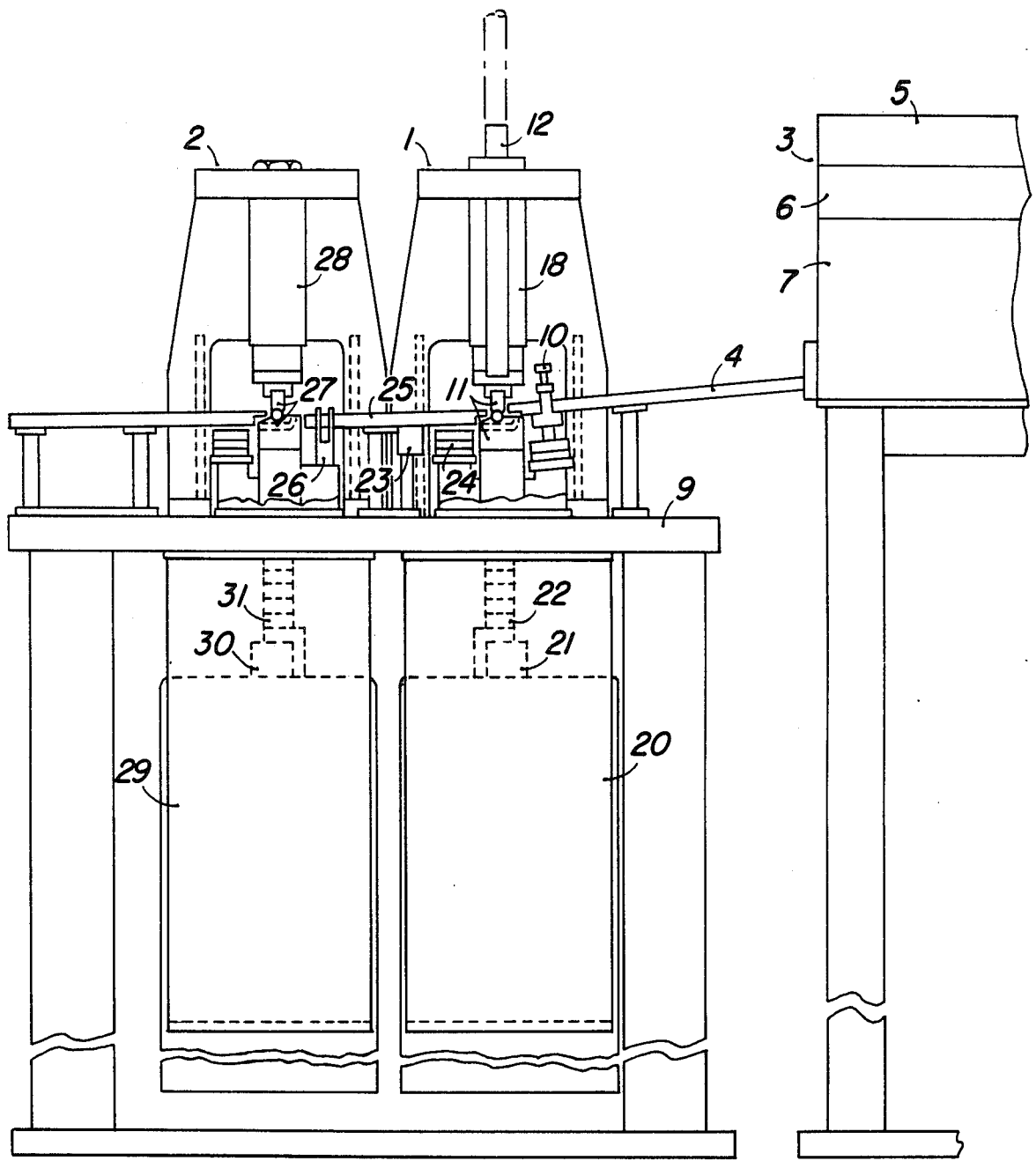
FIG. 1 is a side view of the general assembly of the machine.
FIG. 4 illustrates the parts prior to welding.
FIG. 5 shows the finished part after welding, annealing and removal of the material upset during the welding process.
Figure 2:
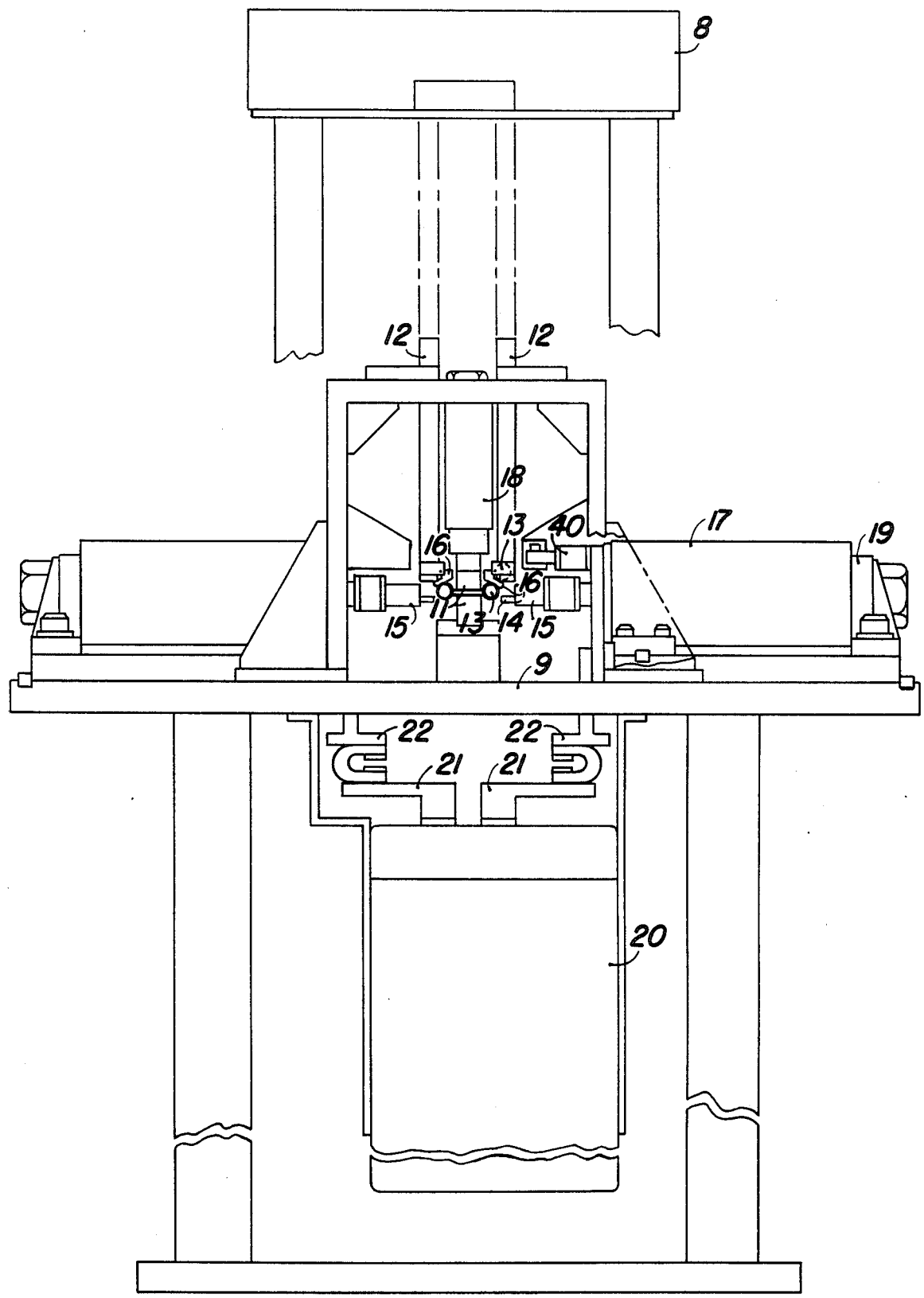
FIG. 2 is a front view.

Referring now to FIGS. 1 and 2 side view and front view of the machine, comprising a welding station (1), an annealing station (2), rod feeding apparatus (3) consisting of hopper (5), vibratory bowl feeder (6), rod length checking device (7), and the ball feeder (8), mounted upon the base plate (9) supported on a pedestal. The rods that are not rejected slide down the rod feed ramp (4) until they reach the rod escapement device (10), which delivers one rod at a time upon demand to the rod clamps (11) at the welding station. Balls (13) which are to be welded to the rod are fed from the ball feeder (8) to two tubes (12) through which the balls move progressively to a position above the retracted electrodes (15) from which point they are dropped upon nylon ball supports (14) which are attached to each of the two separate electrodes. The balls (13) are dropped when the ball escapement devices (16) are actuated after the gun electrodes are fully retracted and the rod workpiece clamped securely in clamp (11) under the force generated by air cylinder (18) to the piston of which the upper portion of clamp (11) is fixed. With the two balls supported on electrically non conductive pins (14) at each of the two gun electrodes, the welding gun cylinders are actuated, causing the gun electrodes (15) carrying the balls (13) on supports (14) to move towards the rod. When the balls make contact with the rod under a preset force as determined by force transducer (19) the welding transformer (20) is energized and welding current passes from terminals (21) of the welding transformer (20) through the flexible conductors and fixed conductors (22) through both gun electrodes (15) and through the rod and balls (13), welding the balls to the rod at the interface between rod and balls. During the welding period the balls move towards each other against the rod, to reach positions limited by an adjustable limit device (40). Means are provided during the passage of current for monitoring the electric current being delivered to the parts being welded to insure proper welding of the balls to the rod. After welding, the workpiece is unclamped by releasing the air from the clamping cylinders (18). The transfer ramp (25) is then lifted to the position shown in FIG. 1 by the action of workpiece ejector (24) and the welded part rolls onto the transfer ramp (25) and down the ramp towards the annealing station. The parts will be fed to the welding station and the welded part will continue down the transfer ramp until the transfer ramp is filled. Means (23) are provided on the transfer ramp to indicate when a desired number of parts are on the ramp, after which an escapement device (26) at the annealing station end of the ramp is actuated to feed a part to the annealing station. The parts as released by the escapement device (26) roll onto the lower portion of clamp (27) which is shaped to properly nest the welded part. Clamping cylinder (28) is then actuated, causing the upper clamp (27) to move downward and apply itself with force upon the welded part. With the welded parts secured by the clamps at the annealing station (2), a transformer (29), (30), conductors (31), and electrode operating arrangement similar to that at the welding station is energized and the current is caused to pass through the rod and ball assembly in order to anneal the welded area and reduce the tendency toward brittleness which may have been created during the welding operation. The annealing station is also provided with means for forging the part and controlling the length of the part to a given tolerance during the forging operation. This is done by using double-acting cylinders, applying air to both sides of each piston during the annealing operation while the current is being passed through the part and then releasing the air rapidly from the rod end of both pistons so that the full force developed by the air applied to the opposite end of the piston is effective rather than the difference between the forces being applied to both sides of the same piston at the same time, as is done during the annealing operation. After the desired preset control current and part temperature are reached, the rod-side pressure is removed and full forging occurs while the part is still red hot and until the piston and electrode motion is stopped by the action of the floating stop as described below. The floating stop insures equal forging on each side should the part not be exactly centered in the annealer clamps.

It is necessary that the electrodes maintain intimate contact between electrode and ball. The electrodes are first pre-machined perfectly concentric to the Morse taper which supports the electrode and are then coined with a ball bearing of the same size that is being welded. They are then polished to an 8 micro inch finish which results in a precise fit with 70% minimum contact area which avoids arcing or hot spots on the ball surface.

Figure 3:
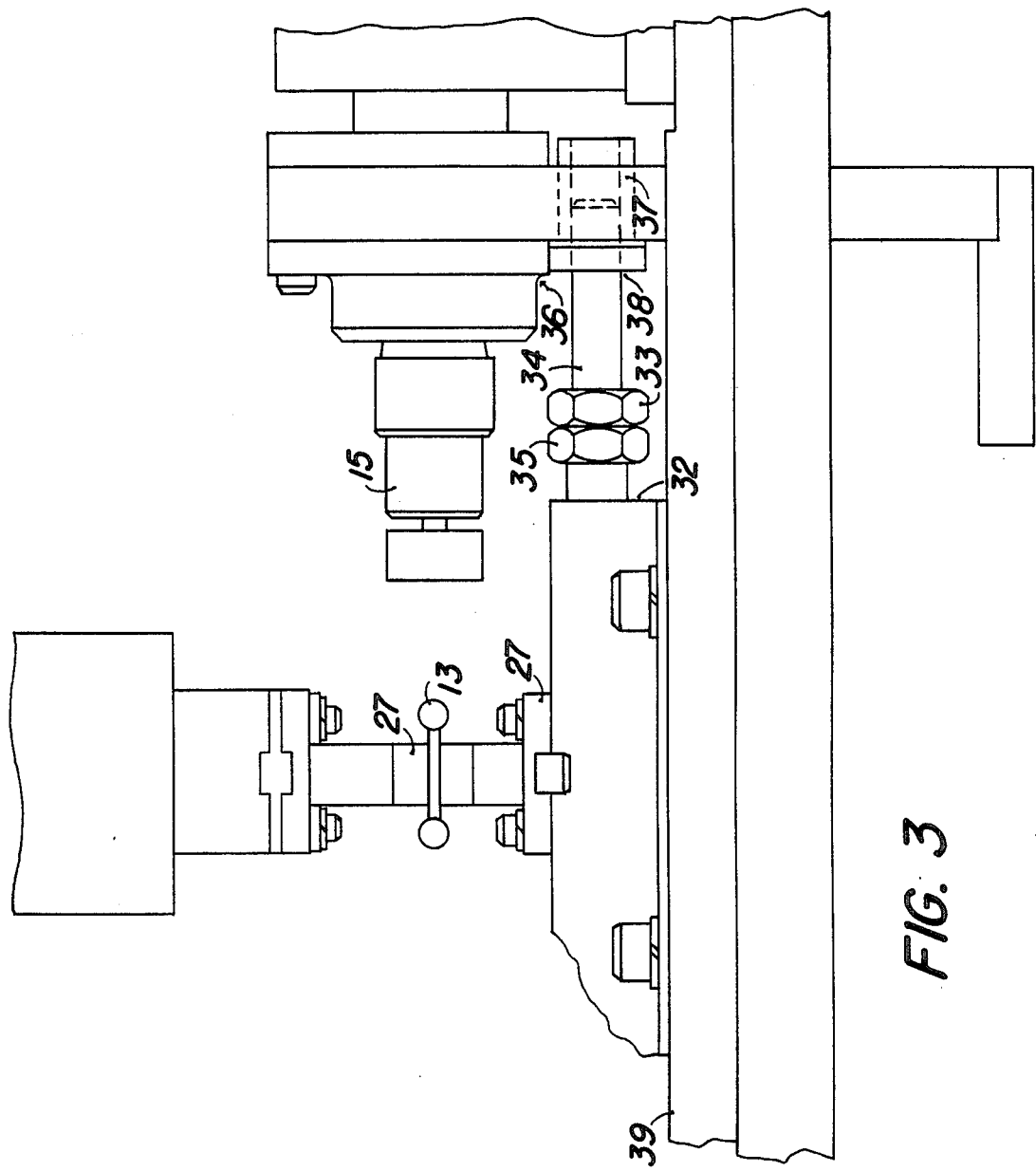
FIG. 3 is a detailed drawing of the annealing station.

FIG. 3 illustrates the method used during the forging and annealing process to insure that the parts are upset properly and that the desired dimension between balls is maintained in accordance with the preset tolerances established. The lower portion of clamp (27) which is machined with a nest to receive the welded part is fastened to the base plate (9) through a spacer plate (39), as is hollow cylindrical slide (32), within which shaft (34) is arranged to slide. Shaft (34) is provided over a section close to each end with a threaded portion upon which are fastened stop nut (33) and lock nut (35). The face of arm (38) which is attached to the electrode holder assembly (36), which is fastened to the piston rod of a pneumatic or hydraulic operator, is provided with a loose guide (37) into which the end of the shaft (34) may enter. A similar arrangement is provided at the other end of shaft (34). A threaded portion and stop nut (33) and lock nut (35) are also provided. The stop nuts at both ends of the shaft (34) will limit the motion of the two electrode holders and their electrodes so that the upset forces provided by the two forging and upsetting cylinders will limit the upset to a well defined amount. Parts made by this method are found to be within +0.001" of the desired overall length and with uniform upset.

This invention is not to be limited to or by details of construction of the particular embodiment illustrated by the drawings, as various other forms of the device will, of course, be apparent to those skilled in the art without departing from the spirit of the invention or the scope of the claims.

What I claim is:

1. An automatic piston rod fabricating machine for producing piston connecting rod assemblies from metal rods and balls comprising:
   means for temporarily storing batches of rods and balls;
   means for feeding the said rods from said storage means to an inspection device which is arranged to reject rods whose dimensions are not within given tolerances;
   a resistance welding machine including clamps for holding rods to which balls are to be welded and means for actuating said clamps;
   shuttle means for feeding rods sequentially into said clamps;
   means for feeding balls from the ball storage means to a position on the resistance welding machine which will allow a ball to be automatically placed at each end of a rod held by said clamps;
   means for applying a force between the last mentioned balls and rod;
   means for passing electric current through the said balls and rod so as to form an assembly of a rod with a ball welded at each end;
   means operative after said welding operation for releasing the welded ball and rod assembly from the clamps and conveying said assembly to an annealing means;
   means for feeding the said assembly into a clamp associated with the said annealing means;
   means for generating a high electric current and passing said current through the said assembly;
   means associated with said annealing means for forging and sizing the assembly to preset tolerances; and
   means for removing the assembly from the annealing means to an exit conveyor.

2. A piston rod fabricating machine as in claim 1 including means for monitoring the electric current passing through the said assembly.

3. A piston rod fabricating machine as in claim 1 including transfer means for effecting the sequential transfer of each said welded assembly to the clamps of the said annealing means, the said transfer means comprising a transfer ramp for supporting and conveying a number of said welded assemblies towards the annealing means, means for sensing the number of assemblies on said transfer ramp and means for transferring a welded assembly to the clamps associated with said annealing means when a predetermined number of assemblies are on the said ramp.

4. A method of producing piston connecting rod assemblies from metal cylindrical rods and two balls comprising the steps of:

temporarily storing rods and balls in separate storage means;

releasing said rods from said storage means in series;

causing said rods to pass through an inspection device arranged to reject rods whose dimensions are not within given tolerances;

depositing rods which are in tolerance in sequence upon an inclined conveyor which causes said rods to move towards a shuttle mechanism cooperating with a welding machine which is fitted with a rod clamping means and opposing electrodes;

causing the shuttle mechanism to move the rod closest to the welding machine to the said rod clamping means;

clamping said rod in said clamping means;

causing balls from aforementioned ball storage means to be deposited and held close to the ends of said rod by ball supports fixed to said electrodes, the said balls being centered along a line passing through the longitudinal axis of said rod;

causing the said electrodes and said balls to move towards the ends of the rod so that the balls are placed in contact with the ends of the rod;

applying a force between balls and rod;

causing current to pass from a welding transformer through said electrodes, balls and rod so as to form a welded assembly of said balls welded to the ends of said rod;

releasing said welded assembly from said clamps and causing said assembly to be transferred to a second conveyor for transfer to an annealing station;

clamping the said welded assembly in a clamping device at the annealing station;

applying a first force through a second set of electrodes to the ends of the welded assembly;

passing electric current from a power source through said second set of electrodes and through said welded assembly so as to bring the welded assembly to a temperature suitable for annealing the said assembly and applying a greater force to the ends of the welded assembly so as to force and size the part to a preset dimension.

5. In a method in accordance with claim 4, the additional step of measuring the electric current passing through the assembly and controlling said electric current so that it follows a preset pattern of power versus time.

6. In a method in accordance with claim 4, the step of presetting the duration of time allowed for a welded assembly to be transported from the welding station to the annealing station.

* * * * *